United States Patent
Kim et al.

(10) Patent No.: US 8,332,662 B2
(45) Date of Patent: Dec. 11, 2012

(54) SEMICONDUCTOR INTEGRATED CIRCUIT AND TESTING METHOD THEREOF

(75) Inventors: Sun-Kwon Kim, Suwon-si (KR);
Byeong-Hoon Lee, Seoul (KR);
Ki-Hong Kim, Suwon-si (KR);
Hyuck-Jun Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1036 days.

(21) Appl. No.: 12/249,495

(22) Filed: Oct. 10, 2008

(65) Prior Publication Data

US 2009/0095955 A1 Apr. 16, 2009

(30) Foreign Application Priority Data

Oct. 12, 2007 (KR) .................. 10-2007-0103194

(51) Int. Cl.
*G06F 21/00* (2006.01)
(52) U.S. Cl. ........................................ 713/194
(58) Field of Classification Search .................. None
See application file for complete search history.

(56) References Cited

U.S. PATENT DOCUMENTS

| | | | | |
|---|---|---|---|---|
| 5,948,102 | A * | 9/1999 | Wuidart | 726/23 |
| 6,032,858 | A * | 3/2000 | Yazumi et al. | 235/379 |
| 6,289,455 | B1 * | 9/2001 | Kocher et al. | 713/194 |
| 2003/0149914 | A1 * | 8/2003 | Kim | 714/30 |
| 2003/0226092 | A1 * | 12/2003 | Kim et al. | 714/776 |
| 2004/0112965 | A1 * | 6/2004 | Schepers | 235/492 |
| 2005/0044403 | A1 * | 2/2005 | Kim | 713/200 |
| 2005/0123132 | A1 | 6/2005 | Sumner | |
| 2006/0043202 | A1 * | 3/2006 | Kim et al. | 235/492 |
| 2006/0186211 | A1 * | 8/2006 | Kim et al. | 235/492 |
| 2007/0018003 | A1 * | 1/2007 | Jeong | 235/492 |
| 2007/0047688 | A1 * | 3/2007 | Sung et al. | 375/375 |
| 2007/0277070 | A1 * | 11/2007 | Janke et al. | 714/736 |
| 2008/0088429 | A1 * | 4/2008 | Laackmann | 340/506 |
| 2009/0049548 | A1 * | 2/2009 | Garbe et al. | 726/22 |

FOREIGN PATENT DOCUMENTS

| | | |
|---|---|---|
| JP | 2002-032732 | 1/2002 |
| KR | 1020030066858 A | 8/2003 |
| KR | 1020040106075 A | 12/2004 |

* cited by examiner

*Primary Examiner* — Oscar Louie
(74) *Attorney, Agent, or Firm* — F. Chau & Associates, LLC

(57) ABSTRACT

A semiconductor integrated circuit including a detector and a secure checker. The detector generates a detection signal upon sensing an abnormal state in an operating environment of the semiconductor integrated circuit. The secure checker generates a check signal to find an operating condition of the detector and receives the detection signal. The detector activates the detection signal in response to the check signal.

15 Claims, 6 Drawing Sheets

Fig. 7

| CHK_B[2] | CHK_B[1] | CHK_B[0] | Check Detector |
|---|---|---|---|
| 0 | 1 | 1 | Frequency Detector |
| 1 | 0 | 1 | Voltage Detector |
| 0 | 1 | 0 | Temperature Detector |

SEMICONDUCTOR INTEGRATED CIRCUIT AND TESTING METHOD THEREOF

CROSS-REFERENCE TO RELATED APPLICATION

This U.S. non-provisional patent application claims priority under 35 U.S.C. §119 to Korean Patent Application No. 10-2007-0103194 filed on Oct. 12, 2007, the entire contents of which are incorporated herein by reference.

BACKGROUND

The present disclosure relates to semiconductor integrated circuits. More specifically, the present disclosure is concerned with a semiconductor integrated circuit equipped with a secure function capable of protecting the circuit from information leakage, destruction, or modulation by an unauthorized user.

Since the advent of credit cards in the 1920s, nowadays many kinds of plastic cards are widely used in the form of cash cards, security cards, personal identification cards, stock cards, or shopping cards. In recent years, there has been a lot of activity concerning integrated circuit cards (or IC cards), which may be called 'small computers', because of their convenience, stability, and multi-usability for users.

Such IC cards are generally made in structures in which thin semiconductor chips are fixed to plastic cards of a size as large as credit cards. IC cards are rapidly rising on their usefulness for new-generation information media, owing to higher data stability than traditional cards to which magnetic tapes or magnetic stripes are attached, and high security, as well as good preservability that provides data without anxiety of data loss. A generic IC card is configured in a chip-on-board (COB) type in which a semiconductor chip of 0.5 mm is fixed onto a plastic sheet made with the same size and thickness as a credit card.

IC cards are generally shaped and sized like typical magnetic stripe cards, usually being classified into contact and contactless types. The contactless types include contactless IC cards (CICCs) and remote coupling communication cards (RCCCs). CICCs are developed by American Telephone and Telegraph (AT&T) in the USA, which are sensible within the range of ½ inch. RCCCs are identifiable in a distance about 700 cm and follow the standard of ISO DIS 10536.

On the other hand, IC cards may be sorted into smart cards, contactless cards, and memory cards. The smart cards embed microprocessors (or central processing units) therein. The contactless and memory cards are formed without microprocessors. The smart card is generally organized of a central processing unit (CPU), an electrically erasable and programmable read-only memory (EEPROM) or ROM, and a random access memory (RAM). The most general advantage of the smart card is the facility that enables it to be equipped with various applications, as well as high reliability and security, large data capacity, and usability for E-purses. Smart cards are capable of inputting and outputting information, adaptable to bilateral communication, distributed processing, and protection of information. With those capabilities, smart cards are making great strides in many service applications, such as finance, distributions, factory automation, office automation, medical services, social securities, mobile communications, pay telephones, cable television networks, electric power, gas, water supply, education, credit cards, debit cards, prepaid cards, utility gas management, information security, home banking, and so forth. Nowadays, those services are inclined to consolidate their channels into a single smart card.

To accomplish such ends, it is necessary to provide systems and service methods therefor that render the smart cards able to be more conveniently used, for example, as a means for financial settlement, or associated with various application forms.

As aforementioned, data stored in smart cards are needed to be conserved in safety. Data being leaked externally from the smart cards may cause serious results even to system managers. Furthermore, occasionally internal data of smart cards can be fatally damaged from actions that directly monitor the insides of semiconductor chips for the purpose of finding internal signals or data thereof. There is a way of monitoring chips, which removes a silicon oxide ($SiO_2$) film, used as a passivation layer, from the surface of a semiconductor chip and monitors the metal signal lines, exposed on the chip surface, by mean of an oscilloscope. The technique of removing a passivation layer of silicon oxide film from a chip surface is called 'decapsulation'. To protect such an invasion that monitors the internal signals of a chip, it is necessary to provide a detection device for providing an alarm upon an attempted decapsulation. Such detection devices are known to include, for example, light exposure detectors, passivation removal detectors, and so on Another way for monitoring a semiconductor chip of the smart card is to check on the data transceived through a data line by lowering a frequency of a main clock signal. In this way, a frequency detector is used for sensing whether the frequency of the main clock signal is within a predetermined range.

It is necessary for a smart card to be equipped with units for preventing damage thereto due to abnormal operation environments, as well as for protecting the card from an invasion by an unauthorized user. For example, a voltage detector may be employed to prevent the smart card chip from electrical damage when a voltage supplied from a card reader is out of a normal range. Furthermore, a temperature detector may be used for preventing the smart card chip from an abnormal operation due to a too high or too low ambient temperature.

Usually, a smart card operates to reset all circuits, including a microprocessor, when there is a detection signal from at least one of the aforementioned detectors, such as a light exposure detector, passivation removal detector, frequency detector, voltage detector, and temperature detector, as well as protecting itself from an information leak, destruction, or modulation by external attacks, and damage caused by abnormal operation environments.

Because such structural supplementaries with those detectors for smart cards have been generally known by others, however, it is possible for hackers to attack the smart card chip in the manner of interrupting signal paths to internal circuits (logic circuits or a microprocessor) from the detectors and providing an arbitrary detection signal into the internal circuits. In this case, since there is no input of a detection signal from the detectors to the internal circuit, it is unaware of an invasion by an unauthorized user or damage by an environmental abnormality.

SUMMARY OF THE INVENTION

Exemplary embodiments of the present invention are directed to a semiconductor integrated circuit capable of assuring the reliability of detection signals that are provided to internal circuits from detectors.

An exemplary embodiment of the present invention comprises a semiconductor integrated circuit including a detector and a security checker. The detector generates a detection signal upon sensing an abnormal operational environment of the semiconductor integrated circuit. The secure checker generates a check signal to find an operating condition of the detector and receives a detecting signal. The detector activates the detection signal in response to the check signal.

In an exemplary embodiment, the secure checker outputs a signal informing of the abnormal state if the detection signal is inactive after the activation of the check signal.

The secure checker operates to reset the semiconductor integrated circuit if the detection signal is inactive after the activation of the check signal.

In an exemplary embodiment, the semiconductor integrated circuit further includes a time control unit providing a reply time to the detector and the secure checker. The detector activates the detection signal in response to the check signal after the reply time has lapsed.

In an exemplary embodiment, the secure checker operates to reset the semiconductor integrated circuit if the detection signal is inactive after the reply time has lapsed following the activation of the check signal.

In an exemplary embodiment, the time control unit is formed of a random number generator operating in sync with a clock signal.

In an exemplary embodiment, the detector and the secure checker operate in sync with the clock signal.

In an exemplary embodiment, the secure checker periodically activates the check signal after every predetermined time period.

In an exemplary embodiment, the secure checker activates the check signal in response to an external request for checking.

In an exemplary embodiment, the secure checker operates to reset the semiconductor integrated circuit if the detection signal is activated while the check signal is inactive.

In an exemplary embodiment, the semiconductor integrated circuit further includes a random number generator generating a random number. The secure checker outputs the check signal that includes a plurality of data bits corresponding to the random number. The detector activates the detection signal if the check signal matches with a predetermined check value.

Another exemplary embodiment of the present invention comprises a semiconductor integrated circuit including: a plurality of detectors generating detection signals upon sensing abnormal states in the operational environment of the semiconductor integrated circuit; a random number generator generating a random number; and a secure checker generating a plurality of data bits corresponding to the random number and receiving the detecting signal from the plurality of detectors. The detectors activate the detection signals when the data bits match with predetermined check bits.

In an exemplary embodiment, the detectors employ check bits that are different from each other.

In an exemplary embodiment, the secure checker operates to reset the semiconductor integrated circuit when the detection signal is inactive in correspondence with the data bit after outputting the data bits.

In an exemplary embodiment, the detector and the secure checker operate in sync with a clock signal.

In an exemplary embodiment, the secure checker periodically generates the plural data bits every predetermined time in correspondence with the random number.

An exemplary embodiment of the present invention also provides a method for testing a state of a detector generating a detection signal for sensing whether a semiconductor integrated circuit operates in a normal condition. The method is comprised of: providing a check signal to the detector; finding activation of the detection signal in response to the check signal; and resetting the semiconductor integrated circuit if the detection signal is inactive.

In an exemplary embodiment, finding the activation of the detection signal is carried out by checking whether the detection signal is activated in a predetermined time after providing the check signal to the detector.

In an exemplary embodiment, the method is further comprised of setting a reply time. Finding the activation of the detection signal is carried out by checking whether the detection signal is activated within the reply time after activation of the check signal.

In an exemplary embodiment, the check signal is periodically provided to the detector.

Additionally, exemplary embodiments of the present invention also provide a method for testing states of a plurality of detectors generating a plurality of detection signals from sensing whether a semiconductor integrated circuit operates in a normal condition. This method is comprised of: providing a plurality of check signals to the detectors respectively; finding activations of the detection signals in response to each of the plurality of check signals; and resetting the semiconductor integrated circuit if the detection signals are inactive in correspondence with the plurality of check signals.

According to exemplary embodiments of the present invention, it is possible to assure the reliability of detection signals that are provided as the internal signals from the detectors. Moreover, because it is permissible to test operating conditions of the detectors, the integrated circuit can be rendered to sense the detection signals even when it is exposed to external trials by hackers or abnormal operational environments.

A further understanding of the nature and advantages of the exemplary embodiments of the present invention herein may be realized by reference to the remaining portions of the specification and the attached drawings.

BRIEF DESCRIPTION OF THE FIGURES

Non-limiting and non-exhaustive exemplary embodiments of the present invention will be described with reference to the following figures, wherein like reference numerals refer to like parts throughout the various figures unless otherwise specified. In the figures:

FIG. 7 exemplarily shows active patterns of the detectors responding to a check signal output from the secure checker shown in FIG. 6.

DETAILED DESCRIPTION OF EXEMPLARY EMBODIMENTS

Figure 1:
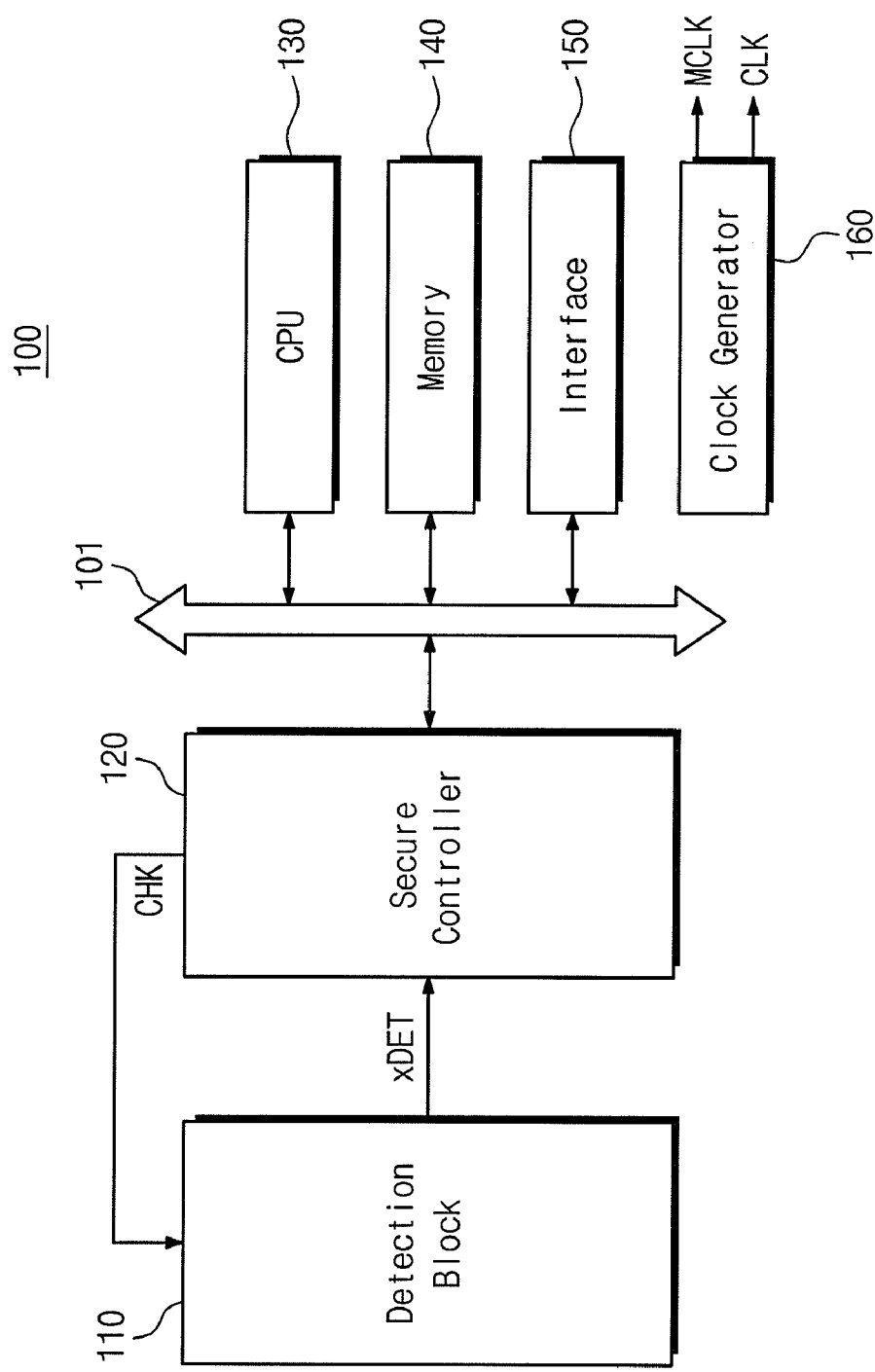
FIG. 1 is a block diagram of a semiconductor integrated circuit according to an exemplary embodiment of the present invention.

Exemplary embodiments of the present invention will be described below in more detail with reference to the accompanying drawings.

The present invention may, however, be embodied in different forms and should not be constructed as limited to the exemplary embodiments set forth herein. Rather, these exemplary embodiments are provided so that this disclosure will be thorough and complete, and will fully convey the scope of the present invention to those of ordinary skill in the art. Like reference numerals refer to like elements throughout the accompanying figures.

FIG. 1 is a block diagram of a semiconductor integrated circuit according to an exemplary embodiment of the present invention. The semiconductor integrated circuit shown in FIG. 1 will be referred to as a 'smart card' including a CPU.

Referring to FIG. 1, the smart card 100 is comprised of a detection block (or detector) 110, a secure controller 120, a CPU 130, a memory 140, an interface 150, and a clock generator 160. The secure controller 120, the CPU 130, the memory 140, and the interface 150 are connected to each other by way of a bus 101. The memory 140 may comprise a ROM, a RAM, an EEPROM, and a flash memory. The interface 150 is provided for enabling signal input/output operations between the smart card 100 and external devices. The clock generator 160 operates to generate a main clock signal MCLK and a clock signal CLK for the smart card 100. The main clock signal MCLK is necessary for the CPU 130. It is permissible to make the main clock signal MCLK the same as or different from the clock signal CLK in frequency.

The detection block 110 operates to sense operating conditions of the smart card 100 and generate a detection signal (or detection signals) xDET. The secure controller 120 outputs a signal when the detection signal xDET denotes that the smart card 100 is operating in an abnormal environmental condition. For instance, if the secure controller 120 outputs a signal informing that the smart card 100 is operating in an abnormal operating state, the CPU is reset, an interrupt occurs to stop a current operation of the smart card 100, or a flag is set to provide an alarm of the abnormal state.

More specifically, in the smart card 100 according to an exemplary embodiment of the present invention, the secure controller 120 applies a check signal CHK to the detection block 110 so as to find out whether the detection block 110 is operating in a normal condition. The detection block 110 activates the detection signal xDET in response to the check signal CHK. If the detection signal xDET is activated after applying the check signal CHK to the detection block 110, the secure controller 120 regards the detection block 110 as operating in a normal condition. Unless the detection signal xDET is activated and/or activated within a predetermined time, the secure controller 120 outputs a signal informing that the detection block 110 is operating in an abnormal condition.

According to this operative feature of an exemplary embodiment of the present invention, it is possible to find out whether the detection block 110 has been damaged by hackers, or whether there is a modification against the detection signal xDET transferred to the secure controller from the detection block 110. Thus, it assures the reliability of the detection signal output from the detection block 110, thereby improving the security of the smart card 100.

Figure 2:
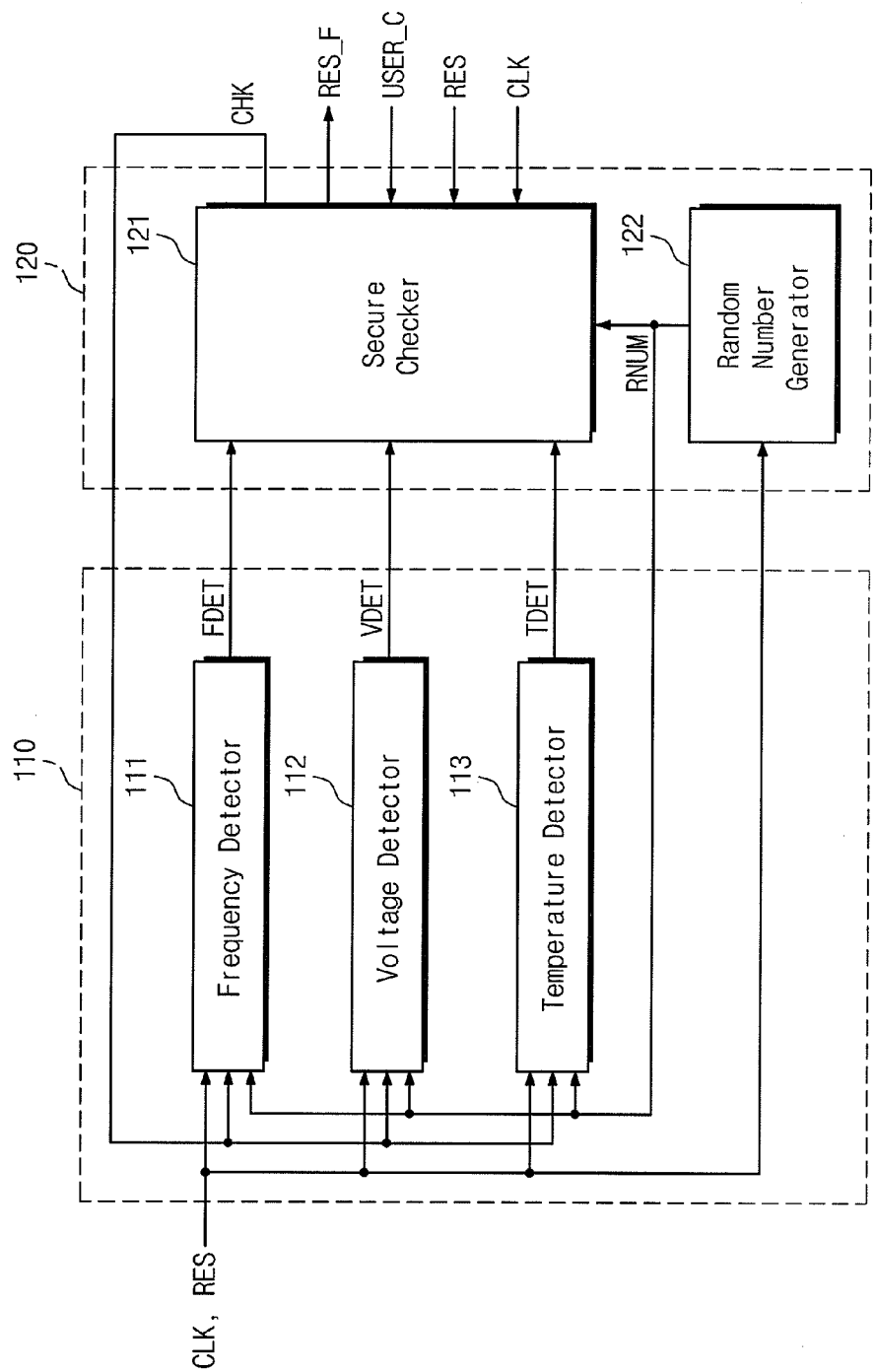
FIG. 2 is a block diagram of the detection block and the secure controller of FIG. 1 in accordance with an exemplary embodiment of the present invention.

FIG. 2 is a block diagram of the detection block 110 and the secure controller 120 of FIG. 1 in accordance with an exemplary embodiment of the present invention.

Referring to FIG. 2, the detection block 110 comprises a frequency detector 111, a voltage detector 112, and a temperature detector 113. The secure controller 120 includes a secure checker 121 and a random number generator 122. The frequency detector 111 operates to detect a frequency of the main clock signal MCLK or the clock signal CLK and generates a frequency detection signal FDET when a detected frequency is out of a predetermined frequency band. The voltage detector 112 operates to detect a level of a voltage supplied from an external device, for example, from a card reader and generates a voltage detection signal VDET when a detected voltage level is out of a predetermined voltage range. The temperature detector 113 operates to detect the ambient temperature around the smart card 100 and generates a temperature detection signal TDET when the detected temperature is higher or lower than a predetermined temperature range. While this exemplary embodiment shows only the three detectors 111~113, it is possible for the smart card 100 to employ additional various detecting units in order to find external invasions and abnormal environmental conditions, for example, a light exposure detector, a passivation removal detector, and so on. Thus, it is possible to vary the number and kinds of detectors in the smart card 100.

The secure checker 121 applies the check signal CHK to the detectors 111~113 so as to check on the operating states of the detectors 111~113. The detectors 111~113 generate the detection signals FDET, VDET, and TDET, respectively, in response to the check signal CHK. The secure checker 121 regards the detectors 111~113 as operating under normal conditions if the detection signals FDET, VDET, and TDET are activated after outputting the check signal CHK. Otherwise, if there is an inactive one of the detection signals FDET, VDET, and TDET, the secure checker 121 determines that the detector corresponding to the inactive detection signal is operating in an abnormal state and generates a reset flag signal RES_F to reset the CPU 130.

In another exemplary embodiment according to the present invention, the signal RES_F output from the secure checker 121 may be an interrupt signal or a flag signal informing of an abnormal state when there is an inactive one of the detection signals FDET, VDET, and TDET. In still another exemplary embodiment according to the present invention, the signal RES_F output from the secure checker 121 may be a signal informing that the detectors 111~113 are operating in normal conditions.

The secure controller 120 shown in FIG. 2 includes the random number generator 122. The random number generator 122 operates to generate a random number RNUM in sync with the clock signal CLK, functioning as a time control unit. The random number RNUM output from the random number generator 122 is provided to each of the detectors 111~113 and to the secure checker 121. The detectors 111~113 and the secure checker 121 also operate in sync with the clock signal CLK.

Figure 3:
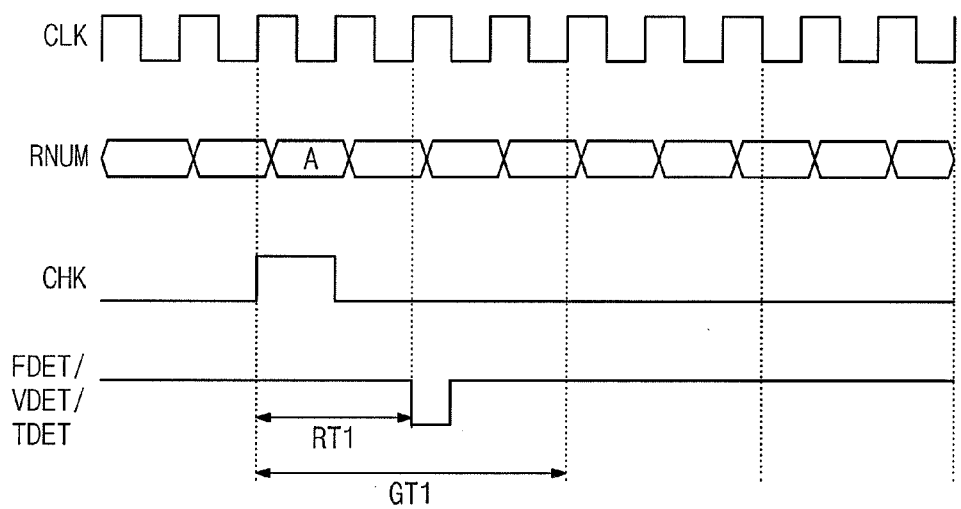
FIGS. 3 and 4 are timing diagrams of signals operating in the detectors and secure controller shown in FIG. 2.
Figure 4:
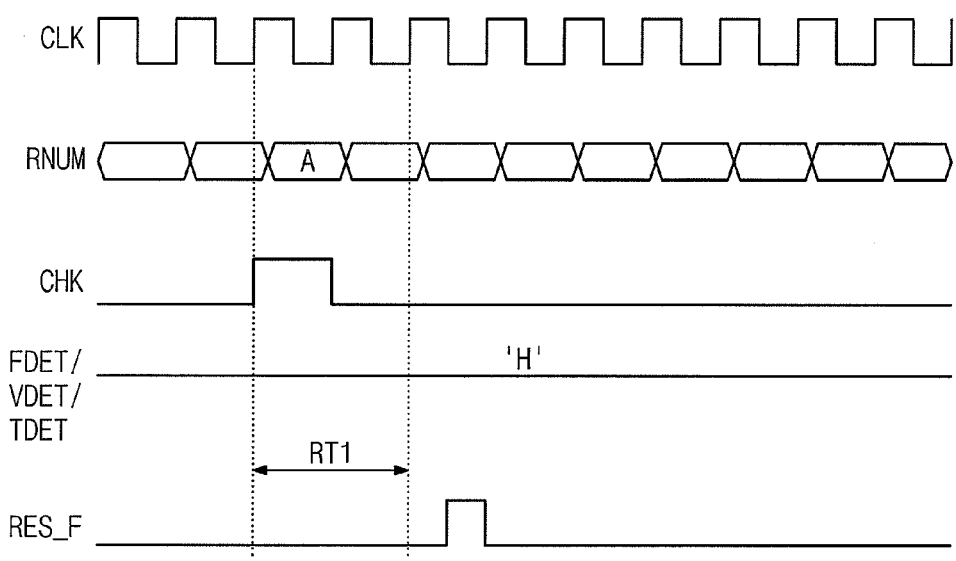

FIGS. 3 and 4 are timing diagrams of signals operating in the detectors and secure controller shown in FIG. 2.

Referring to FIG. 3, if the secure checker 121 outputs the check signal CHK at a time corresponding to the random number RNUM supplied from the random number generator 122, the detectors 111, 112, and 113 output the respective detection signals FDET, VDET, and TDET of low levels in response to the check signal CHK and the random number RNUM. During this operation, the detection signals FDET, VDET, and TDET are actually pseudo detection signals.

After a reply clock cycle RT1 corresponding to the random number RNUM, for example, 'A'; where RNUM='A' supplied from the random number generator 122, the secure checker 121 finds out whether there is an input of the detection signals FDET, VDET, and TDET which are low-level pulse signals generated respectively from the detectors 111, 112, and 113. The random numbers RNUM are generated in a range corresponding to the maximum reply clock cycle GT1. If the random number RNUM='A' of the random number generator 122 corresponds to two clock cycles when the secure checker 121 generates the check signal CHK, the detectors 111, 112, and 113 output the respective detection signals FDET, VDET, and TDET of low levels. If there is no reception of the low-level detection signals FDET, VDET, and TDET after two clock cycles, the detectors 111~113 are regarded as being in abnormal conditions and then the reset flag signal RES_R shown in FIG. 4 is activated.

As the random number RNUM created from the random number generator 122 is variable every clock cycle, it is rare for an interrelation pattern between the check signal CHK and the detection signals FDET, VDET, and TDET to be disclosed to or discovered by hackers or unauthorized users. Therefore, it is possible to find the status that the detection block 110 operates abnormally or the detection signals xDET transferred from the secure controller 120 have been modified.

In another exemplary embodiment, the secure checker 121 determines whether the detection signals FDET, VDET, and TDET, which have been input thereto as low-level pulses, return to high levels after a predetermined time, for example, one clock cycle, following the reply clock cycle RT1 corresponding to the random number RNUM='A'. Unless the detectors 111, 112, and 113 respective return the detection signals FDET, VDET, and TDET to high levels after transitioning them to low levels in response to the check signal CHK, the secure checker 121 determines that at least one of the detectors FDET, VDET, and TDET is conditioned in abnormal states.

Figure 5:
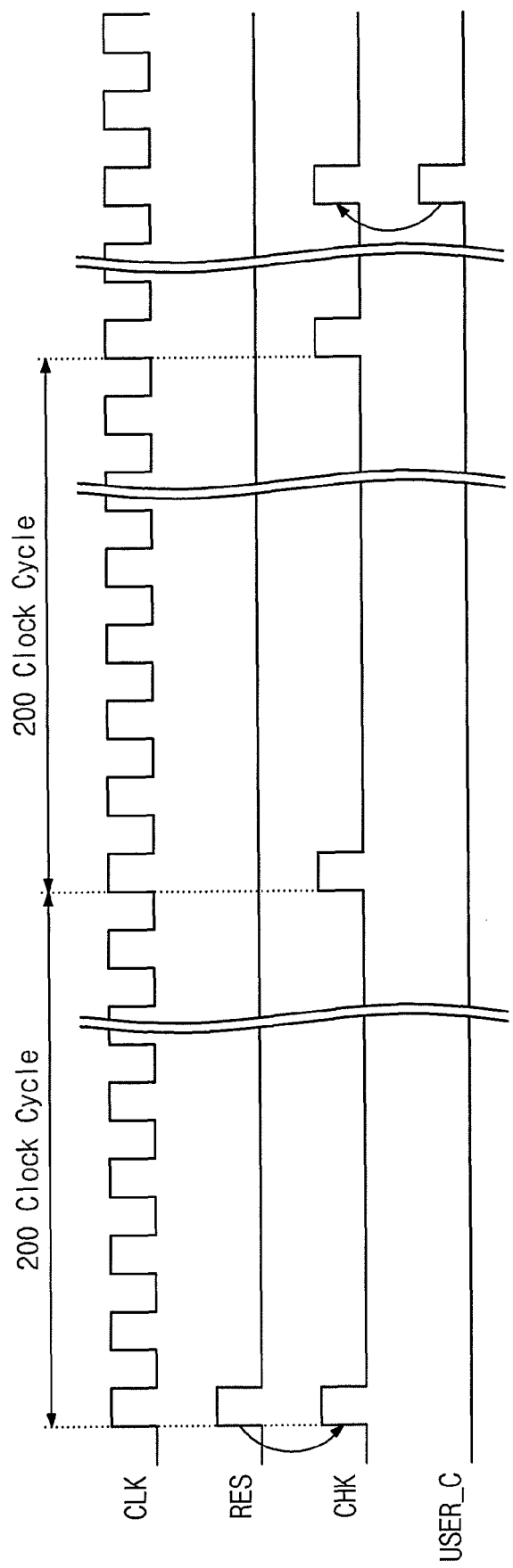
FIG. 5 is a timing diagram exemplarily showing output points of the check signal from the secure checker of FIG. 2.

FIG. 5 is a timing diagram exemplarily showing output points of the check signal CHK from the secure checker 121 of FIG. 2.

Referring to FIG. 5, the secure checker 121 outputs the check signal CHK when the CPU 130 is reset, that is, when the reset signal RES becomes active. The secure checker 121 may be designed to output the check signal CHK every predetermined period, which is 200 clock cycles in this exemplary embodiment. According to another exemplary embodiment, the secure checker 121 may be designed to output the check signal CHK in a period that is variable in response to the random number RNUM provided from the random number generator 122. On the other hand, the secure checker 121 may be configured to output the check signal CHK periodically in a predetermined pattern.

On the other hand, the secure checker 121 may be designed to output the check signal CHK in response to a user's control. For instance, it is helpful in protecting from leaks of confidential data if the operating conditions of the detectors 111, 112, and 113 are checked before transmitting, receiving, or processing confidential data. The CPU 130 activates a user control signal USER_C by a program that is processed therein and then the secure checker 121 outputs the check signal CHK in response to the user control signal USER_C.

If there is an active one of the detection signals FDET, VDET, and TDET from the respective detectors 111, 112, and 113 even in a period in which the operation for checking the operating conditions of the detectors is not performed, the secure checker 121 determines that the smart card 100 is conditioned in an abnormal state, or there is an access thereto by an authorized user, and then outputs the reset flag signal RES_F to reset the CPU 31.

Figure 6:
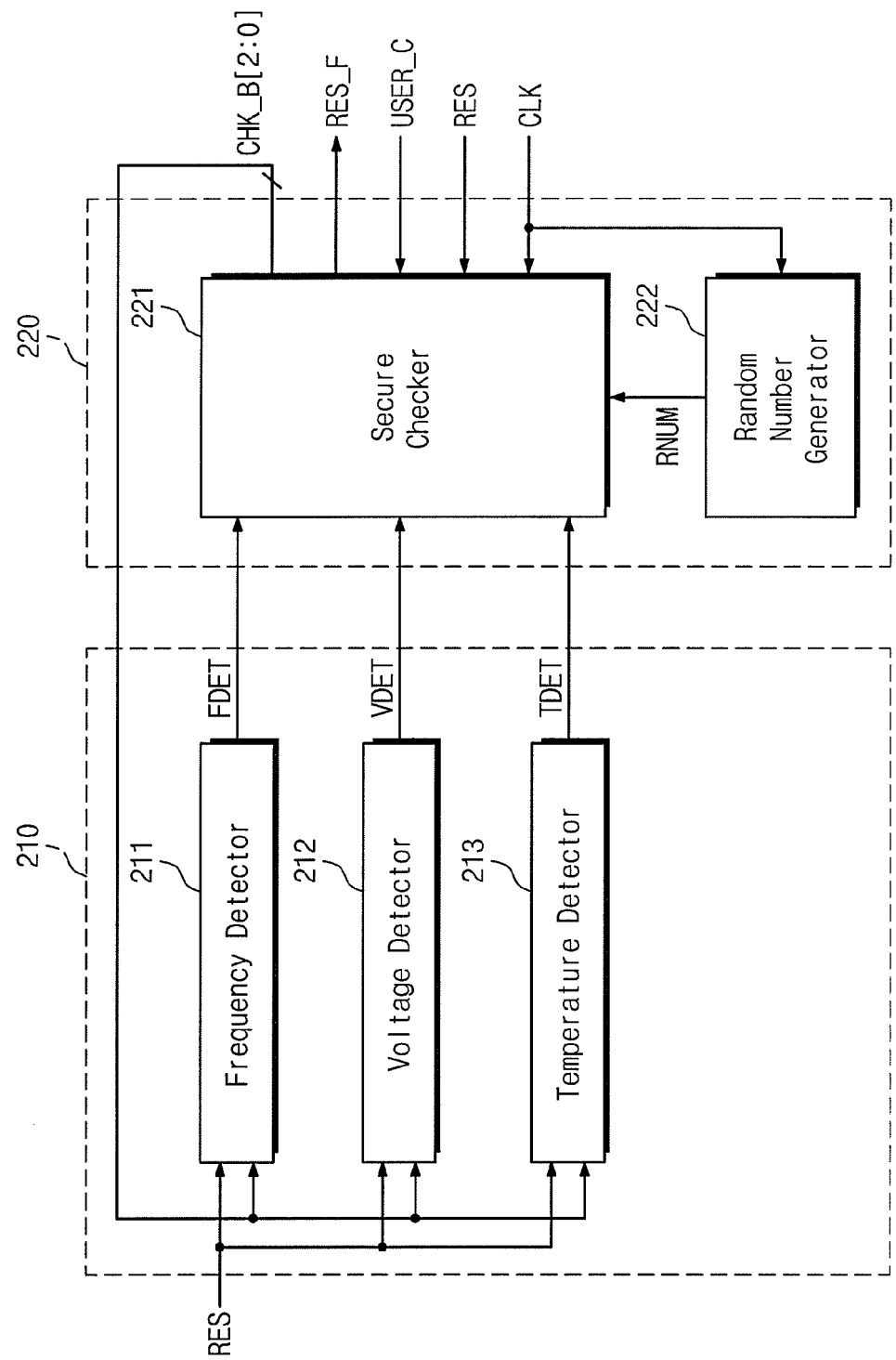
FIG. 6 is a block diagram of the detectors and secure controllers according to an exemplary embodiment of the present invention.

FIG. 6 is a block diagram of the detectors and secure controllers according to an exemplary embodiment of the present invention.

The detectors 211, 212, and 213 shown in FIG. 6 operate in response to a check signal CHK_B[2:0] of plural data bits provided from the secure checker 221, without using random numbers from a random number generator 222 or the clock signal CLK. The detectors 211, 212, and 213 store their own respective reference values that are different from each other, and output detection signals when the data bits of the check signal CHK_B[2:0] of the secure checker 221 match the reference values stored therein. The secure checker 221 generates the check signal CHK_B[2:0] in correspondence with the random number supplied from the random number generator 222.

FIG. 7 exemplarily shows active patterns of the detectors responding to the check signals CHK_B[2:0] output from the secure checker 221 shown in FIG. 6.

Referring to FIGS. 6 and 7, the frequency detector 211 activates the frequency detection signal FDET when the check signal CHK_B[2:0] is '011'. The voltage detector 212 activates the voltage detection signal VDET when the check signal CHK_B[2:0] is '101'. The temperature detector 213 activates the temperature detection signal TDET when the check signal CHK_B[2:0] is '010'. As such, it is possible to simplify circuit structures of the detectors by designing the detectors 211~213 to be operable without being synchronized to the clock signal CLK.

This operational feature in which the detectors 211, 212, and 213 respectively generate the detection signals FDET, VDET, and TDET in response to the check signal CHK_B[2:0] makes it difficult for an unauthorized user to modify and provide the detection signals FDET, VDET, and TDET into the secure checker 221. Therefore, it improves the reliability of the detection signals provided from the detectors toward internal circuits of the smart card.

In another exemplary embodiment, the secure controller 220 may be designed to output the check signal CHK_B[2:0] so as to sequentially vary from '000' to '111', without using the random number generator 222, or to output the check signals in predetermined patterns.

In another exemplary embodiment, the detectors 211~213 may be designed to activate the detection signals in response to the same data bit pattern of the check signal CHK_B[2:0].

On the other hand, the secure checker 221 shown in FIG. 6 may be designed to output the check signal every cycle period, or in response to the user control signal USER_C, when the reset signal RES is activated. The period for outputting the check signal is variable, which may be designed for example to be in accord with the random numbers.

The above-disclosed subject matter is to be considered illustrative, and not restrictive, and the appended claims are intended to cover all such modifications, enhancements, and other exemplary embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A semiconductor integrated circuit comprising:
a secure checker that generates a check signal and activates the check signal to a different logic level to check an operating condition of a detector of the circuit; and
the detector receiving the check signal and generating a detection signal for output to the secure checker, wherein the detector is configured to determine whether an operating environment of the semiconductor integrated circuit is in a normal state or an abnormal state, wherein the detector maintains the detection signal at a first logic level when the detector determines the environment is in the normal state, and wherein the detector sets the detection signal to a second and different logic level after the detector receives the activated check signal and determines the environment is in the abnormal state, wherein the secure checker outputs a reset signal to the semiconductor integrated circuit in response to receipt of the detection signal at the second logic level to reset the semiconductor integrated circuit.

2. The semiconductor integrated circuit as set forth in claim 1, further comprising a time control unit providing a reply period to the detector and the secure checker, wherein the detector sets the detection signal to the second logic level after the reply period after receipt of the activated check signal.

3. The semiconductor integrated circuit as set forth in claim 2, wherein the time control unit includes a random number generator operating in sync with a clock signal.

4. The semiconductor integrated circuit as set forth in claim 3, wherein the detector and the secure checker operate in sync with the clock signal.

5. The semiconductor integrated circuit as set forth in claim 1, wherein the secure checker activates the check signal periodically.

6. The semiconductor integrated circuit as set forth in claim 1, wherein the secure checker activates the check signal in response to an external request for checking.

7. The semiconductor integrated circuit as set forth in claim 1, wherein the secure checker operates to reset the semiconductor integrated circuit when the detection signal is set to the second logic level and the check signal is inactive.

8. The semiconductor integrated circuit as set forth in claim 1, further comprising a random number generator generating a random number, wherein the secure checker outputs the check signal including a bit pattern corresponding to the random number, and wherein the detector sets the detection signal to the first logic level if the received bit pattern is equivalent to a pre-defined value.

9. A semiconductor integrated circuit comprising:
a plurality of detectors, each detector generating a detection signal upon sensing abnormal states in an operating environment of the semiconductor integrated circuit, and storing a first bit pattern;
a random number generator generating a random number; and
a secure checker generating a second bit pattern corresponding to the random number to check an operating condition of the detectors, sending the second bit pattern to the detectors, and receiving the detection signals from the plurality of detectors,
wherein each detector maintains its generated detection signal at a first logic level when the received second bit pattern is dissimilar from its stored first bit pattern and each detector sets its generated detection signal to a second other logic level when the received second bit pattern matches with its stored first bit pattern,
wherein the first bit patterns are different from each other,
wherein the secure checker operates to reset the semiconductor integrated circuit when the one of the received detection signals is set to the second logic level after outputting the second bit pattern to the plurality of detectors.

10. The semiconductor integrated circuit as set forth in claim 9, wherein the plurality of detectors and the secure checker operate in sync with a clock signal.

11. The semiconductor integrated circuit as set forth in claim 10, wherein the secure checker generates the second bit pattern periodically in correspondence with the random number.

12. A method for testing a state of a detector that generates a detection signal upon sensing whether a semiconductor integrated circuit operates in a normal condition, the method comprising:
providing, by a secure checker, a check signal to the detector to determine an operating condition of the detector, wherein the detector is configured to determine whether the circuit operates in a normal condition using the check signal;
sending, by the detector, a detection signal to the secure checker that is set to a first logic level to indicate the normal condition and to a second other logic level to indicate an abnormal condition after the check signal is received; and
determining, by the secure checker, whether the detection signal received in response to the check signal is set to the second logic level; and
resetting, by the secure checker, the semiconductor integrated circuit using a reset signal when the detection signal is set to the second logic level.

13. The method as set forth in claim 12, wherein the reset signal is output when the detection signal is set to the second logic level within a reply period after providing the check signal to the detector.

14. The method as set forth in claim 12, wherein the reset signal is output when the detection signal is set to the second logic level within a reply period after providing the check signal to the detector in an activated state.

15. A method for testing states of a plurality of detectors generating a respective plurality of detection signals for sensing whether a semiconductor integrated circuit operates in a normal condition, the method comprising:
providing a plurality of check signals to the plurality of detectors respectively to determine operating conditions of the detectors, wherein each detector is configured to determine whether the circuit operates in the normal condition or an abnormal condition;
outputting, by the detectors, respective detection signals that are set to a first logic level to indicate the normal condition and a second other logic level to indicate the abnormal condition after receipt of the corresponding the check signals;
determining whether the detection signals output in response to each to the plurality of check signals are set to the second logic level; and
resetting the semiconductor integrated circuit when one of the plurality of detection signals is set to the second logic level in correspondence with the plurality of check signals.

* * * * *